(12) United States Patent
Ronciak et al.

(10) Patent No.: US 7,512,684 B2
(45) Date of Patent: Mar. 31, 2009

(54) FLOW BASED PACKET PROCESSING

(75) Inventors: John Ronciak, Beaverton, OR (US);
Christopher Leech, Portland, OR (US);
Prafulla Deuskar, Hillsboro, OR (US);
Jesse Brandeburg, Portland, OR (US);
Patrick Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 810 days.

(21) Appl. No.: 10/957,145

(22) Filed: Sep. 30, 2004

(65) Prior Publication Data

US 2006/0067228 A1 Mar. 30, 2006

(51) Int. Cl.
*G06F 15/173* (2006.01)
*G06F 15/16* (2006.01)
*G06F 11/00* (2006.01)

(52) U.S. Cl. .................. 709/226; 709/227; 370/235

(58) Field of Classification Search ............... 709/226, 709/227, 234, 235, 245; 370/235
See application file for complete search history.

(56) References Cited

U.S. PATENT DOCUMENTS

| | | | |
|---|---|---|---|
| 6,389,468 B1 * | 5/2002 | Muller et al. ............... 709/226 |
| 6,430,628 B1 | 8/2002 | Connor |
| 6,453,360 B1 * | 9/2002 | Muller et al. ............... 709/250 |
| 6,483,804 B1 * | 11/2002 | Muller et al. ............... 370/230 |
| 6,484,209 B1 | 11/2002 | Momirov |
| 6,633,941 B2 | 10/2003 | Dunlap et al. |
| 6,647,438 B1 | 11/2003 | Connor et al. |
| 6,650,640 B1 * | 11/2003 | Muller et al. ............... 370/392 |
| 6,681,275 B2 | 1/2004 | Connor et al. |
| 6,683,873 B1 | 1/2004 | Kwok et al. |
| 6,868,466 B2 | 3/2005 | Connor |
| 6,934,776 B2 | 8/2005 | Connor et al. |
| 6,973,040 B1 | 12/2005 | Ricciulli |
| 7,010,613 B2 | 3/2006 | Connor |
| 7,043,494 B1 | 5/2006 | Joshi et al. |
| 7,162,740 B2 | 1/2007 | Eastlake, III |
| 7,219,228 B2 | 5/2007 | Lin |
| 7,286,483 B2 | 10/2007 | Connor |
| 2002/0144004 A1 | 10/2002 | Gaur et al. |
| 2003/0043810 A1 | 3/2003 | Boduch et al. |
| 2003/0226032 A1 | 12/2003 | Robert |
| 2003/0236911 A1 | 12/2003 | Connor et al. |
| 2004/0120339 A1 | 6/2004 | Ronciak |

FOREIGN PATENT DOCUMENTS

EP 1 367 799 A2 12/2003

OTHER PUBLICATIONS

Steenbergen: Understanding Modern Denial of Service 2001, 10 pages.
Reutsche: The Architecture of a Gb/s Multimedia Protocol Adapter, Computer Communication Review ACM SIGCOMM, vol. 23, No. 3, Jul. 1993, pp. 59-68.

(Continued)

*Primary Examiner*—William C Vaughn, Jr.
*Assistant Examiner*—Yemane Mesfin
(74) *Attorney, Agent, or Firm*—Robert A. Greenberg

(57) ABSTRACT

In general, in one aspect, the disclosure describes a method that includes accessing a packet, determining a flow associated with the packet, and determining, based at least in part on the packet, whether to remove the flow from a list of flows to handle using page-flipping.

29 Claims, 7 Drawing Sheets

OTHER PUBLICATIONS

Intel IXP2400 Network Processor hardware Reference Manual, Nov. 2003, 408 pages.

DAEMON9: Project Neptune, Phrack Magazine, vol. 7, Issue 48, file 13 of 18, Jul. 1996, 23 pages.

FreeBSD/Linux Kernel Cross Reference sys/netinet/tcp_syncache. c, 2001 Networks Associates Technology, Inc., 24 pages.

FreeBSD/Linux Kernel Cross Reference sys/netinet/tcp_syncache. c, 2001 Networks Associates Technology, Inc., 25 pages.

FreeBSD/Linux Kernel Cross Reference sys/sys/queue.h, 1991, 1993, The Regents of the University of California, 10 pages.

Addressing TCP/IP Processing Challenges Using the IA and IXP Processors, Communications Processing, Intel Technology Journal, vol. 7, Issue 4, Nov. 14, 2003, pp. 39-50, 13 pages.

Sapuntzakis et al: The Case for RDMA; Cisco Systems, Dec. 2000, 13 pages.

Int'l Application No. PCT/US2005/044771 Int'l Search Report & Written Opinion dated May 8, 2006.

International Preliminary Report on Patentability, Application No. PCT/US2005/044771, mailed Jun. 28, 2007, 8 pages.

RSS 2.0 at Harvard Law, RSS 2.0 Specification, http://cyber.law. harvard.edu/rss/rss.html, Jul. 15, 2003, 9 pgs.

Miller, et al., Re: Patch for common networking error messages, http://www.uwsg.iu.edu/hypermail/linux/kernel/0306.2/0429.html, Jun. 17, 2003, 2 pgs.

Merry, Zero copy sockets and NFS code for FreeBSD, http://www. mavetju.org/mail/view_message.php?list=freebsd-current &id=715885, Jun. 16, 2000, 5 pgs.

* cited by examiner

FLOW BASED PACKET PROCESSING

BACKGROUND

Networks enable computers and other devices to communicate. For example, networks can carry data representing video, audio, e-mail, and so forth. Typically, data sent across a network is divided into smaller messages carried in packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately.

A number of network protocols cooperate to handle the complexity of network communication. For example, a protocol known as Transmission Control Protocol (TCP) provides "connection" services that enable remote applications to communicate. That is, TCP provides applications with simple mechanisms for establishing a connection and transferring data across a network. Behind the scenes, TCP handles a variety of communication issues such as data retransmission, adapting to network traffic congestion, and so forth.

To provide these services, TCP operates on packets known as segments. Generally, a TCP segment travels across a network within ("encapsulated" by) a larger packet such as an Internet Protocol (IP) datagram. Frequently, an IP datagram is further encapsulated by an even larger packet such as an Ethernet frame. The payload of a TCP segment carries a portion of a stream of data sent across a network by an application. A receiver can restore the original stream of data by reassembling the received segments. To permit reassembly and acknowledgment (ACK) of received data back to the sender, TCP associates a sequence number with each payload byte.

Many computer systems and other devices feature host processors (e.g., general purpose Central Processing Units (CPUs)) that handle a wide variety of computing tasks. Often these tasks include handling network traffic such as TCP/IP connections.

The increases in network traffic and connection speeds have increased the burden of packet processing on host systems. In short, more packets need to be processed in less time. Fortunately, processor speeds have continued to increase, partially absorbing these increased demands. Improvements in the speed of memory, however, have generally failed to keep pace. Each memory access that occurs during packet processing represents a potential delay as the processor awaits completion of the memory operation. Many network protocol implementations access memory a number of times for each packet. For example, a typical TCP/IP implementation performs a number of memory operations for each received packet including copying payload data to an application buffer, looking up connection related data, and so forth.

DETAILED DESCRIPTION

As described above, each memory operation that occurs during packet processing represents a potential delay. As an example, in many current systems, after receiving a packet, a network interface controller (a.k.a. a network adaptor) performs a Direct Memory Access (DMA) to place the packet in memory. Protocol software (e.g., a Transmission Control Protocol/Internet Protocol (TCP/IP) stack) then copies the data from the place where the network interface controller deposited it to where an application requested placement. This copy operation can potentially involve thousands of bytes and may represent a significant use of computing resources and consume considerable packet processing time.

FIGS. 1A-1D illustrate a technique that can potentially eliminate this copy operation by using a technique known as page-flipping. Briefly, a page is a contiguous set of locations in memory. The size of a give page may vary considerably in different implementations (e.g., from 4 kilobyte to 4 megabyte sized pages). The locations in these pages have a physical memory address. For example, a given 1-kilobyte page may feature addresses ranging from byte-0 to byte-1024. In addition to physically addressable pages of memory, many systems provide a feature known as virtual addressing. In virtual addressing, an application or other program is given a virtual address space that may greatly exceed the physical memory available. To support virtual addresses, a mapping is maintained between the virtual pages and pages of physical memory currently allocated to them. When a memory operation occurs, the virtual address of the operation is mapped to a virtual page which is, in turn, mapped to the physical page currently associated with the virtual page. Simply stated, page-flipping involves changing the mapping of a virtual page to a different physical page. In other words, a memory operation to a virtual address that would have previously been routed to one physical page would be routed to a different physical page after a page-flip.

Page-flipping can be used in packet processing by having a network interface controller deposit packet data for packets of a given flow into the same page and then, instead of copying this data to an application specified destination virtual address, simply remapping the virtual page including the destination virtual address to the page storing the network interface controller deposited packet data. To illustrate, FIGS. 1A-1D depict an example of page-flipping used to deliver TCP/IP payloads to an application.

Figure 1A:
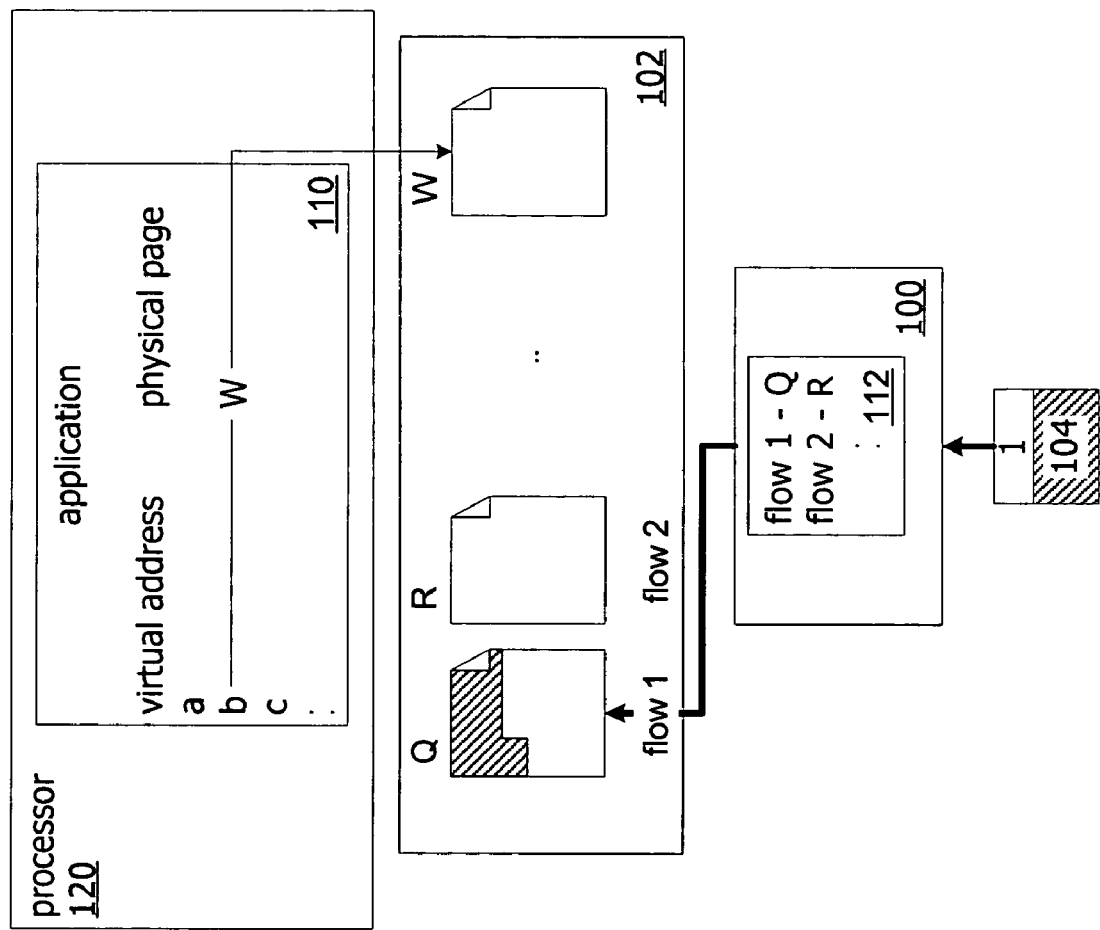
FIGS. 1A-1D illustrate flow-based page-flipping.

The sample implementation shown in FIG. 1A includes a network interface controller 100 and a set of physical pages (arbitrarily labeled pages "Q", "R" and "W") of memory 102. FIG. 1A also depicts data 110 mapping a virtual pages (arbitrarily labeled "a", "b", and "c") to pages in memory 102. For example, as shown, virtual page "b" is currently mapped to physical page "W". That is, a memory operation involving a virtual address within virtual page "b" would be mapped to page "W".

As shown in FIG. 1A, the network interface controller 100 includes data 112 that identifies different flows (arbitrarily labeled "flow 1" and "flow 2") to be handled using page flipping. A flow identifies a related set of packets such as cells in an Asynchronous Transfer Mode (ATM) circuit or TCP/IP connection. For example, a TCP/IP flow can be identified by elements in the header(s) of the TCP/IP packet (a "TCP/IP tuple") such as a combination of a TCP/IP packet's IP source and destination addresses, source and destination ports, and protocol identifier or the flow identifier in an IPv6 packet. Potentially, this TCP/IP header data may be hashed to represent the flow more compactly. As shown, in addition to identifying different flows, the data 112 may also identify pages 102 and/or locations within the pages 102 currently allocated to the flows.

Figure 1B:
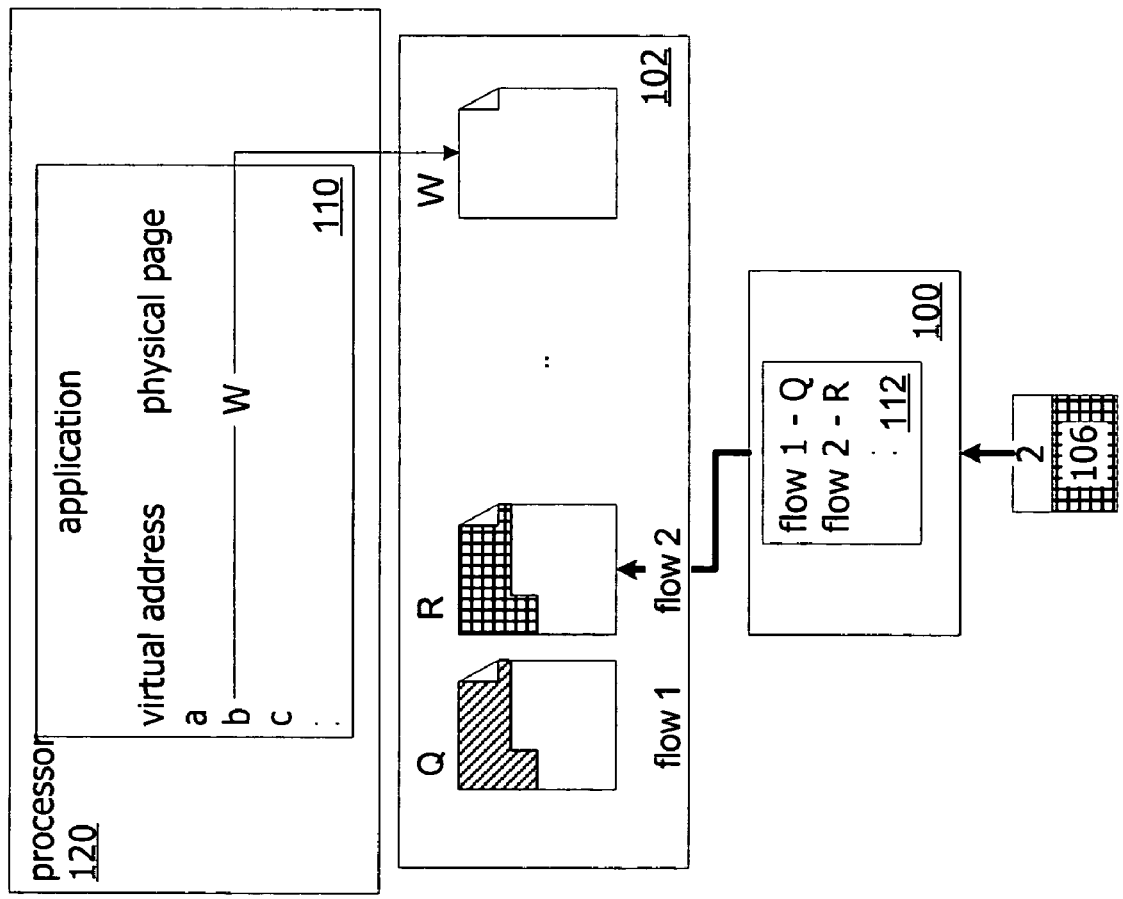

As shown in FIG. 1A, after receiving a packet 104, the network interface controller 100 can determine the flow the packet 104 belongs to and access data 112 to determine if page-flipping is being used to handle packets in the flow. If so, the controller 100 can also use data 112 to determine where to place data in the page currently associated with the flow (e.g., page "Q"). As shown for packet 104, the network interface controller 100 can then deposit (e.g., using Direct Memory Access (DMA)) packet data (e.g., the packet payload) in the page, "Q", associated with the packet's flow. Similarly, as shown in FIG. 1B, the network interface controller 100 deposits data of packet 106 into page "R" associated with flow "2". Though packet data is shown in FIGS. 1A and 1B as starting at a page boundary, the packed data may start at some offset from the page start.

Figure 1C:
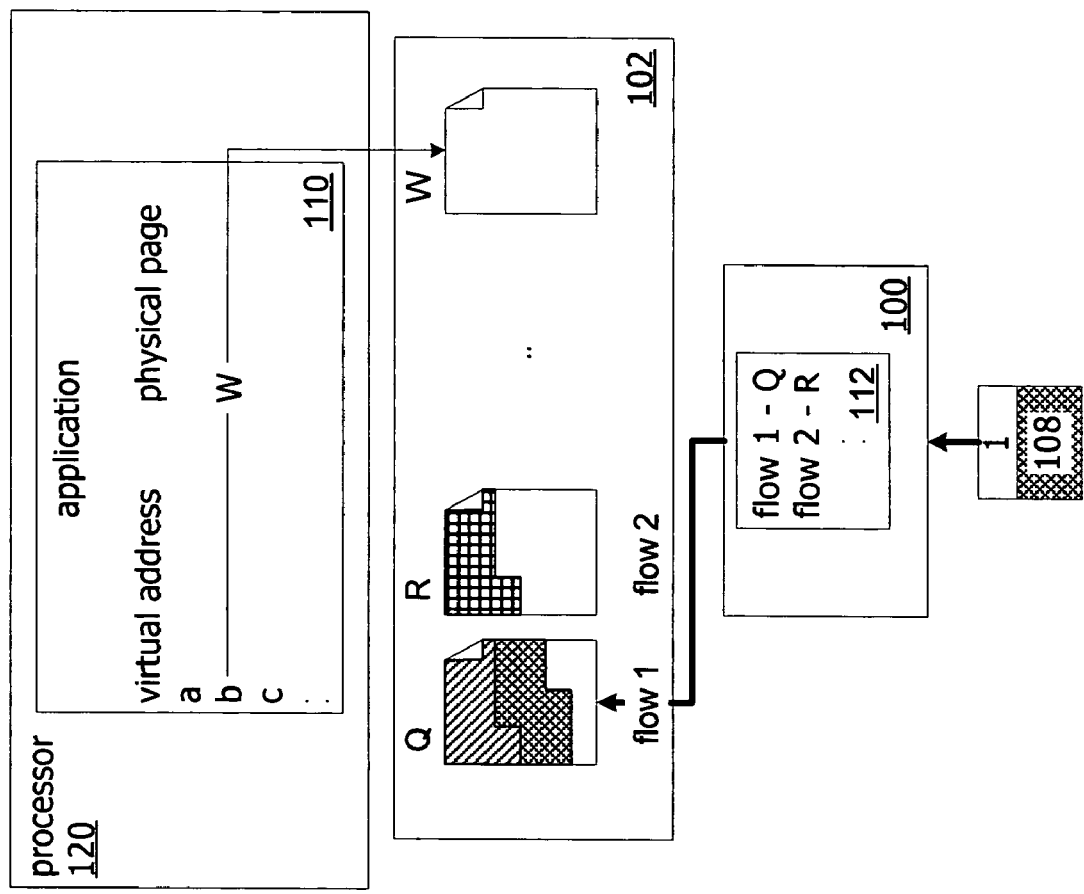
Figure 1D:
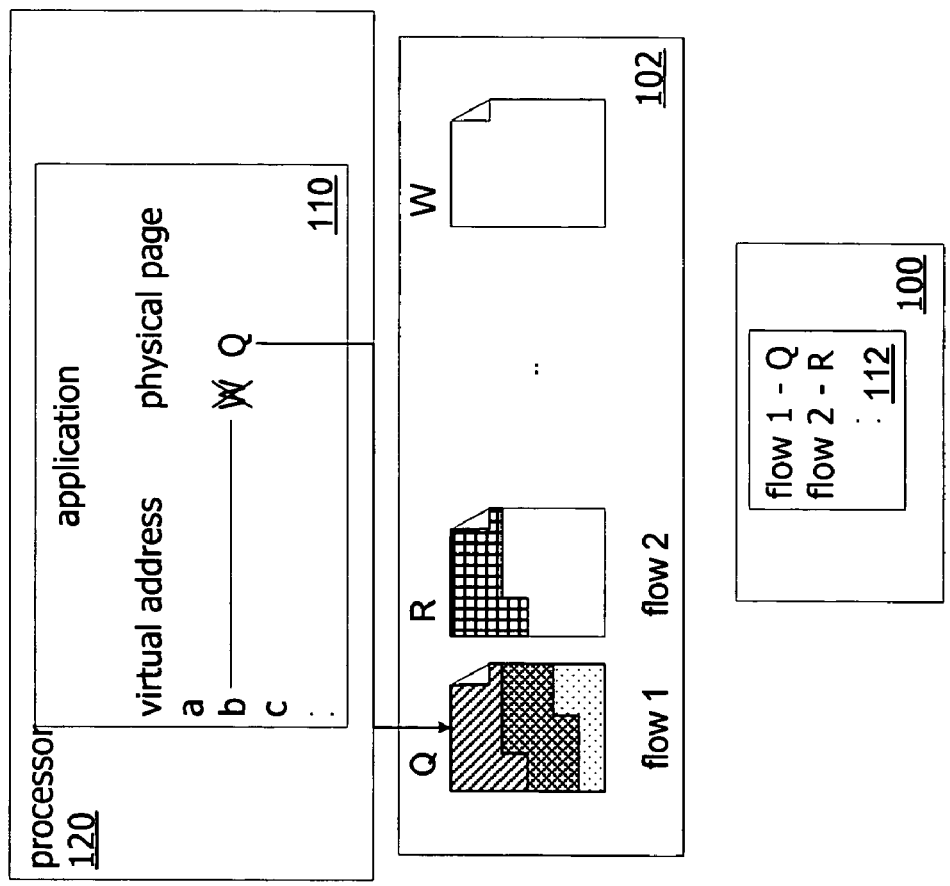

As shown in FIG. 1C, data from packets of the same flow gradually accumulate in the flow's page(s) as the data is appended after receipt of each packet. As shown in FIG. 1D after a page is completely filled (or some other flow related event occurs), the page is flipped in to an application's virtual address space. For example, assuming the application requested placement of flow data in virtual addresses belonging within virtual page "b", page "Q" (holding data of flow "1" packets (e.g., 104 and 108)) can be mapped to virtual page "b" making the packet data available without a copy operation.

Figure 2:
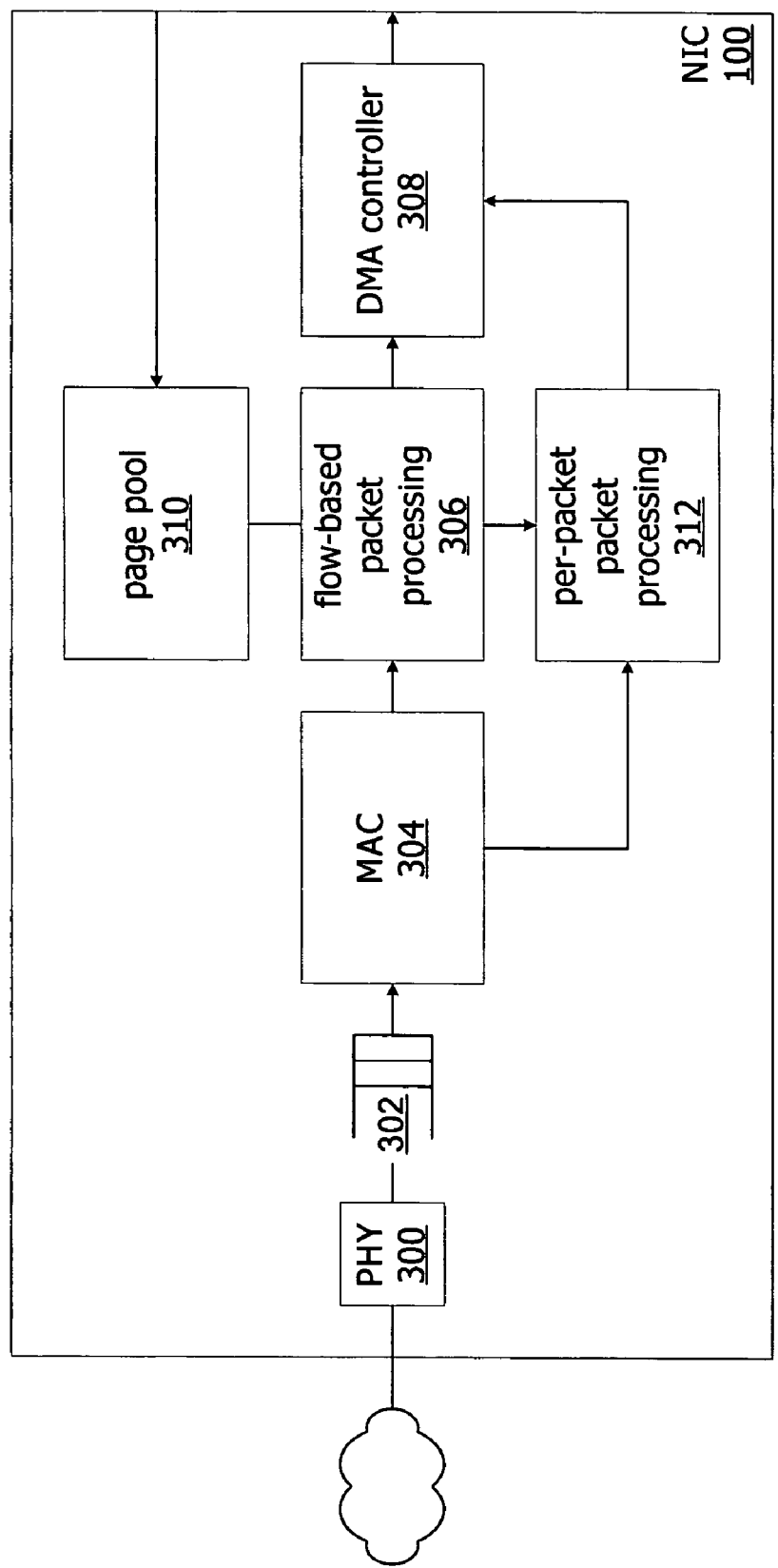
FIG. 2 is a diagram of a network interface controller.

FIG. 2 depicts a sample implementation of a network interface controller 100 that can implement techniques described above. As shown, the network interface controller 100 features a PHY 300 (a PHYsical layer device) that translates between the physical signals carried by different network communications mediums and the bits (e.g., "0"-s and "1"-s) used by digital systems. For received data ("the receive path"), the PHY 300 feeds a FIFO (First-In-First-Out) queue. Media access controller (MAC) processing circuitry 304 consumes data from the queue 302 and can perform operations such as verifying receipt of a frame (e.g., an Ethernet frame), computing and verifying a checksum for a packet and/or performing header splitting (e.g., determining the starting address of the TCP/IP header and the starting address of the TCP segment payload).

As shown, the network interface controller 100 can include circuitry 306 to handle packets based on their flow and circuitry 312 to handle packets on an individual basis. A given packet may be routed to circuitry 312 by the MAC circuitry 304, for example, if the packet is not a TCP/IP packet. The circuitry 312 can then access a packet descriptor provided by driver software executing on the processor that identifies where to store the packet data in memory. The circuitry 312 can then cause a Direct Memory Access (DMA) controller 308 to transfer the packet data to memory 102. The controller 100 can signal an interrupt to the processor 120 that initiates processing of the DMA-ed descriptor/packet data by the protocol stack. Typically, this will scatter the packets of a given flow across many different pages of memory.

In contrast to the operation of circuitry 312, flow-based packet processing circuitry 306 can perform operations described in conjunction with FIGS. 1A-1D. For example, the circuitry 306 can determine the flow a packet belongs to and cause the DMA controller 308 to write packet data to a page associated with the flow for subsequent page-flipping. The circuitry 306 may access data 310 identifying page aligned buffers available for allocation to flows. As one page is filled up, the circuitry 306 can consume a new page from the pool. This pool 310 is continually replenished by driver software operating on the processor 120, for example, by "recycling" pages flipped out of a virtual address space.

Potentially, the network interface controller 100 may only perform page-flipping for a limited subset of on-going flows handled by the controller 100. Thus, circuitry 306 can store data 112 (e.g., in a Content-Addressable Memory (CAM)) that identifies flows to be handled using page-flipping. Absence (e.g., a CAM miss for the flow identifier) from the flow list may indicate that the packet should not be handled using page-flipping. The data 112 associated with a given flow may include the flow identifier (e.g., a hash of a TCP/IP tuple) and the next address within the flow's current page to append packet data. The flows listed may be established, for example, by a driver or dynamically managed by the controller 100, for example, based on currently on-going flows. As described below, flows may be ejected from the list based on a variety of criteria. For example, flows may be removed in favor of more recently active flows based on a Least Recently Used (LRU) scheme. Potentially, the circuitry 306 may maintain a list of flows (not shown) not to be processed using page-flipping instead of/in addition to data 112. This can prevent a flow from thrashing back and forth between page-flipping/no-page-flipping status.

Figure 3:
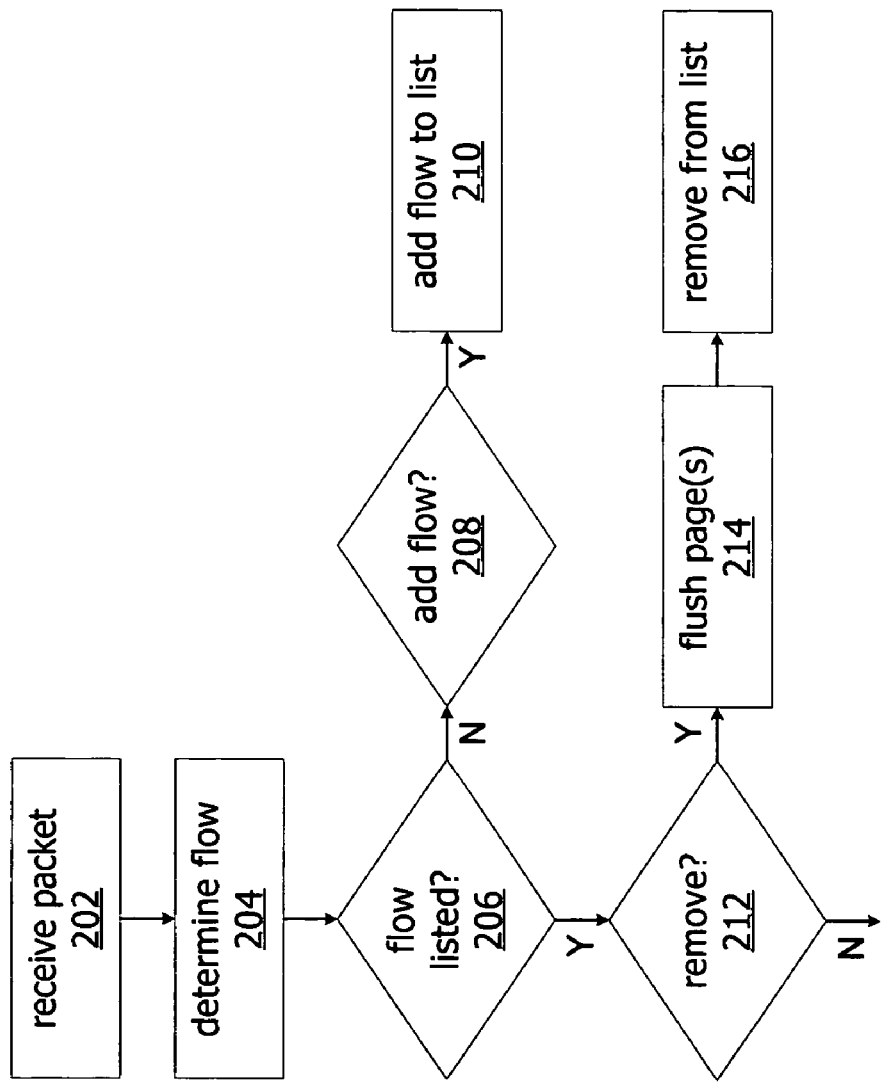
FIG. 3 is a flow chart of operations performed by a network interface controller.

FIG. 3 is a flow-chart depicting operation of the sample controller shown in FIG. 2. As shown, the controller 100 determines 204 the flow of a received 202 packet, for example, by hashing header contents (e.g., a TCP/IP tuple). Based on the resulting flow identifier, the controller 100 performs a lookup to determine 206 whether the packet is part of a flow to be handled using page-flipping. If the flow is not listed, the flow may be considered for addition 208 to list, for example, if the packet represents the start of a new flow (e.g., a TCP SYN packet). If the controller 100 adds 210 the flow to the list, the controller 100 may victimize a different flow. Addition of a flow to the list may be subject to a number of criteria (e.g., a minimum TCP window size and/or packet size).

For flows included in the page-flipping list, the controller 100 may attempt to determine 212 whether to remove the flow from the list. For example, if a packet is received out-of-order, the controller 100 may instead use circuitry 312 to deposit packet data in pages in memory and allow the protocol stack to perform reassembly. The test performed to determine whether a packet is out-of-order may be a determination of whether a previous sequence number received for a flow is greater than the sequence number of the received packet.

Other packet characteristics may cause a flow to be removed from the flow list. For example, if the received packet terminates a flow (e.g., a TCP FIN or RST packet), if the packet reduces the TCP window of the flow, or if the packet identifies itself as a fragmented IP packet. Additionally, the controller 100 may remove a flow from the list if the flow features too many smaller sized packets (e.g., a number of packets that fall beneath some threshold or an average packet size falls below a threshold).

The controller 100 may also periodically gauge flow activity and remove inactive flows from the flow list such as flows not having any received packets or not advancing a TCP receive window after some interval. Additionally, the controller 100 may remove flows, for example, if an out-bound packet being transmitted through the controller 100 closes a flow (e.g., a FIN or RST packet).

If a flow is removed the controller 100 can signal the driver to indicate 214 data previously placed in a page associated with the flow. Once removed from the flow list 216, subsequent packets belonging to the flow would be handled using descriptors identifying locations in memory instead of concentrating packet data from a flow into the flow's page(s).

Figure 4:
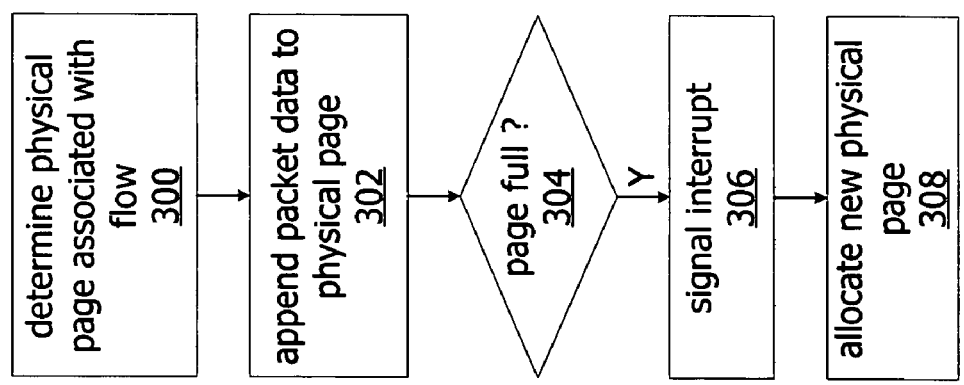
FIG. 4 is a flow chart illustrating page-flipping.

As shown in FIG. 4, for packets in flows using page-flipping, the controller 100 determines 300 the page associated with the flow and DMAs packet data to append 302 to previous flow data stored in the page. When a page is filled 304 or other event occurs (e.g., a TCP FIN for the flow and/or removal from the flow list 216), the controller 100 DMAs descriptors for the packet headers corresponding to the packet payloads included within the page and generates an interrupt to the processor 120. In response to the interrupt, driver software operating on the processor 120 can indicate the headers to the protocol stack and initiate a page-flip of the flow data into the virtual address space of the application acting as the end-point of the flow.

The implementations describe above are merely exemplary and a wide variety of variations are possible. For example, instead of being a separate component, the controller may be integrated into a chipset or a processor. The techniques may be implemented in a variety of architectures including processors and network devices having designs other than those shown. The term packet can apply to IP (Internet Protocol) datagrams, TCP (Transmission Control Protocol) segments, ATM (Asynchronous Transfer Mode) cells, Ethernet frames, among other protocol data units. Additionally, the above often referred to packet data instead of simply a packet. This reflects that a controller, or other component, may remove and/or add data to a packet as the packet data travels along a receive or transmit path.

The term circuitry as used herein includes hardwired circuitry, digital circuitry, analog circuitry, programmable circuitry, and so forth. The programmable circuitry may operate on executable instructions disposed on an article of manufacture. For example, the instructions may be disposed on a Read-Only-Memory (ROM) such as a Programmable Read-Only-Memory (PROM)) or other medium such as a Compact Disk (CD) and other volatile or non-volatile storage.

Other embodiments are within the scope of the following claims.

What is claimed is:

1. A method, comprising:
   accessing an Internet Protocol (IP) datagram encapsulating a Transmission Control Protocol (TCP) segment (TCP/IP packet);
   determining a TCP/IP flow associated with the received TCP/IP packet;
   based on the TCP/IP flow, determining whether to cause placement of data from the TCP/IP packet into a host application's address space using a page flipping operation of a page of memory allocated to the TCP/IP flow;
   if it is determined to cause placement of data from the TCP/IP packet into a host application's address space using a page flipping operation of a page allocated to the TCP/IP flow, causing placement of data of the received TCP/IP packet into the page of memory assigned to the flow to subsequently be flipped into a host application's address space; and
   if it is determined to not cause placement of data from the TCP/IP packet into a host application's address space using a page flipping operation of a page allocated to the flow, causing placement of data of the received TCP/IP packet in the host application's address space without page flipping of a page of memory assigned to the TCP/IP flow;
   wherein data of at least a first on-going TCP/IP flow is placed into the host application's address space using page-flipping of a page of memory assigned to the first on-going TCP/IP flow and data of at least a second on-going TCP/IP flow is placed into the host application's address space without page-flipping of a page of memory assigned to the second on-going TCP/IP flow.

2. The method of claim 1, further comprising
   determining, based at least in part on the received TCP/IP packet, whether to remove the TCP/IP flow from a list of flows to handle using page-flipping; and
   wherein the determining whether to cause placement of data from the TCP/IP packet into a host application's address space using a page flipping operation of a page of memory allocated to the TCP/IP flow comprises determining based on whether or not the TCP/IP flow is in the list of flows to handle using page-flipping.

3. The method of claim 1, further comprising altering a mapping of virtual addresses to physical addresses after packet data of multiple TCP/IP packets of the TCP/IP flow have been written to the page allocated to the TCP/IP flow.

4. The method of claim 2, wherein the determining whether to remove the flow from the list of flows comprises determining whether the Transmission Control Protocol (TCP) segment encapsulated by the IP datagram was received out-of-order.

5. The method of claim 2, wherein the determining whether to remove the TCP/IP flow from the list of flows comprises determining whether a size of the TCP/IP packet falls below a threshold size.

6. The method of claim 2, wherein the determining whether to remove the TCP/IP flow from the list of flows comprises determining whether the TCP/IP packet comprises a Transmission Control Protocol (TCP) FIN or RST segment.

7. The method of claim 2, wherein the determining whether to remove the TCP/IP flow from the list of flows comprises determining whether the received TCP/IP packet comprises an Internet Protocol fragment.

8. The method of claim 2, further comprising removing the TCP/IP flow from the list of flows based on a period of time exceeding a threshold, the period of time comprising at least one selected from the following group: (1) a period of time since a packet was last received for the flow; and (2) a period of time without advancing a receive window for the flow.

9. The method of claim 2, further comprising removing the TCP/IP flow from the list of flows based on a transmission of a Transmission Control Protocol (TCP) FIN or RST segment form the flow.

10. The method of claim 2, further comprising removing the TCP/IP flow from the list of flows based on a reduction in a Transmission Control Protocol (TCP) window for the flow.

11. The method of claim 1, further comprising:
    maintaining a list of flows to not handle using page flipping; and
    wherein the determining whether to place data from the TCP/IP packet into a host application's address space using a page flipping operation of a page of memory allocated to the TCP/IP flow comprises determining based on whether or not the TCP/IP flow is in the list of flows to not handle using page-flipping.

12. A network interface controller, the controller comprising:
    at least one interface to a communications medium;
    circuitry to:
      determine a TCP/IP flow associated with a TCP/IP packet received via the communications medium; and
      based on the TCP/IP flow, determine whether to cause Placement of data from the TCP/IP packet into a host application's address space using a page flipping operation of a page of memory allocated to the flow;

if it is determined to cause placement of data from the TCP/IP packet into a host application's address space using a page flipping operation of a page allocated to the TCP/IP flow, causing placement data of the received TCP/IP packet into the page of memory assigned to the flow to subsequently be flipped into a host application's address space; and if it is determined to not cause placement of data from the TCP/IP packet into a host application's address space using a page flipping operation of a page allocated to the flow, causing placement of data of the received TCP/IP packet in the host application's address space without page flipping of a page of memory assigned to the TCP/IP flow;

wherein data of at least a first on-going TCP/IP flow is placed into the host application's address space using page-flipping of a page of memory assigned to the first on-going TCP/IP flow and data of at least a second on-going TCP/IP flow is placed into the host application's address space without page-flipping of a page of memory assigned to the second on-going TCP/IP flow.

13. The controller of claim 12, wherein the circuitry comprises circuitry to:

determine, based at least in part on the received TCP/IP packet, whether to remove the TCP/IP flow from a list of flows to handle using page-flipping;

wherein the circuitry to determine whether to cause placement of data from the TCP/IP packet into a host application's address space using a page flipping operation of a page of memory allocated to the TCP/IP flow comprises circuitry to determine based on whether or not the TCP/IP flow is in the list of flows to handle using page-flipping.

14. The controller of claim 13, wherein the circuitry to determine whether to remove the TCP/IP flow from the list of flows comprises circuitry to determine whether a Transmission Control Protocol (TCP) segment of the TCP/IP packet was received out-of-order.

15. The controller of claim 13, wherein the circuitry to determine whether to remove the flow from the list of flows comprises circuitry to determine whether a size of the TCP/IP packet falls below a threshold size.

16. The controller of claim 13, wherein the circuitry to determine whether to remove the TCP/IP flow from the list of flows comprises circuitry to determine whether the received TCP/IP packet comprises a Transmission Control Protocol (TCP) FIN or RST segment.

17. The controller of claim 13, wherein the circuitry to determine whether to remove the TCP/IP flow from the list of flows comprises to determine whether the received TCP/IP packet comprises an Internet Protocol fragment.

18. An article of manufacture, comprising executable instructions to:

determine a TCP/IP flow associated with a TCP/IP packet; and based on the TCP/IP flow, determine whether to cause placement of data from the TCP/IP packet into a host application's address space using a page flipping operation of a page of memory allocated to the flow;

if it is determined to cause placement of data from the TCP/IP packet into a host application's address space using a page flipping operation of a page allocated to the TCP/IP flow, causing placement data of the received TCP/IP packet into the page of memory assigned to the flow to subsequently be flipped into a host application's address space; and if it is determined to not cause placement of data from the TCP/IP packet into a host application's address space using a page flipping operation of a page allocated to the flow, causing placement of data of the received TCP/IP packet in the host application's address space without page flipping of a page of memory assigned to the TCP/IP flow;

wherein data of at least a first on-going TCP/IP flow is placed into the host application's address space using page-flipping of a page of memory assigned to the first on-going TCP/IP flow and data of at least a second on-going TCP/IP flow is placed into the host application's address space without page-flipping of a page of memory assigned to the second on-going TCP/IP flow.

19. The article of claim 18, determine, based at least in part on the received TCP/IP packet, whether to remove the TCP/IP flow from a list of flows to handle using page-flipping;

wherein the instructions to determine whether to cause placement of data from the TCP/IP packet into a host application's address space using a page flipping operation of a page of memory allocated to the TCP/IP flow comprise instructions to determine based on whether or not the TCP/IP flow is in the list of flows to handle using page-flipping.

20. The article of claim 19, wherein the instructions to determine whether to remove the TCP/IP flow from the list of flows comprise instructions to determine whether a Transmission Control Protocol (TCP) segment of the TCP/IP packet was received out-of-order.

21. The article of claim 19, wherein the instructions to determine whether to remove the flow from the list of flows comprise instructions to determine whether a size of the TCP/IP packet falls below a threshold size.

22. The article of claim 19, wherein the instructions to determine whether to remove the TCP/IP flow from the list of flows comprise instructions to determine whether the TCP/IP packet comprises a Transmission Control Protocol (TCP) FIN or RST segment.

23. The article of claim 19, wherein the instructions to determine whether to remove the TCP/IP flow from the list of flows comprise instructions to determine whether the received TCP/IP packet comprises an internet Protocol fragment.

24. The article of claim 19, further comprising instructions to remove the TCP/IP flow from the list of flows based on a period of time exceeding a threshold, the period of time comprising at least one selected from the following group: (1) a period of time since a TCP/IP packet was last received for the flow; and (2) a period of time without advancing a receive window for the flow.

25. The article of claim 19, further comprising instructions to remove the TCP/IP flow from the list of flows based on a transmission of a Transmission Control Protocol (TCP) FIN or RST segment from the flow.

26. The article of claim 19, further comprising removing the TCP/IP flow from the list of flows based on a reduction in a Transmission Control Protocol (TCP) window for the TCP/IP flow.

27. The article of claim 18, further comprising:

maintaining a list of flows to not handle using page flipping;

wherein the circuitry to determine whether to cause placement of data from the TCP/IP packet into a host application's address space using a page flipping operation of a page of memory allocated to the TCP/IP flow, comprises circuitry to determine based on whether or not the TCP/IP flow is in the list of flows to not handle using page-flipping.

28. A system, comprising:
at least one processor;
at least one randomly accessible memory communicatively coupled to the processor; and
circuitry to:
  access a TCP/IP packet;
  determine a TCP/IP flow associated with the TCP/IP packet, wherein the TCP/IP flow comprises a TCP/IP flow identified by, at least, the packet's Internet Protocol (IP) source address, P destination address, source port, and destination port;
  based on the TCP/IP flow, determine whether to cause placement of data from the TCP/IP packet into a host applications address space using a page flipping operation of a page of memory allocated to the flow;
  if it is determined to cause placement of data from the TCP/IP packet into a host application's address space using a page flipping operation of a page allocated to the TCP/IP flow, cause placement of data of the received TCP/IP packet into the page of memory assigned to the flow to subsequently be flipped into a host application's address space; and
  if it is determined to not cause placement of data from the TCP/IP packet into a host applications address space using a page flipping operation of a page allocated to the flow, cause placement data of the received TCP/IP packet in the host application's address space without page flipping of a page of memory assigned to the TCP/IP flow;
  wherein data of at least a first on-going TCP/IP flow is placed into the host application's address space using page-flipping of a page of memory assigned to the first on-going TCP/IP flow and data of at least a second on-going TCP/IP flow is placed into the host application's address space without page-flipping of a page of memory assigned to the second on-going TCP/IP flow;
  determine, based, at least in part, on the TCP/IP packet, whether to remove the flow from a list of flows to handle using page-flipping, wherein the determination comprises at least one selected from the following group:
    (a) determining whether a Transmission Control Protocol (TCP) segment was received out-of-order;
    (b) determining whether a size of the TCP/IP packet falls below a threshold size; and
    (c) determining whether the TCP/IP packet comprises an Internet Protocol fragment;
  wherein the circuitry to determine whether to cause placement of data from the TCP/IP packet into a host application's address space using a page flipping operation of a page of memory allocated to the TCP/IP flow comprises circuitry to determine based on whether or not the TCP/IP flow is in a list of flows to handle using page-flipping.

29. The system of claim 28,
wherein the circuitry comprises circuitry to maintain a list of flows to not handle using page flipping; and
wherein the circuitry to determine whether to cause placement of data from the TCP/IP packet into a host application's address space using a page flipping operation of a page of memory allocated to the TCP/IP flow, comprises circuitry to determine based on whether or not the TCP/IP flow is in the list of flows to not handle using page-flipping.

* * * * *